(12) United States Patent
Chou

(10) Patent No.: US 11,603,876 B2
(45) Date of Patent: Mar. 14, 2023

(54) TELESCOPIC TUBE WITH ADJUSTMENT MEMORY FUNCTION

(71) Applicant: Ching-Yao Chou, Taichung (TW)

(72) Inventor: Ching-Yao Chou, Taichung (TW)

( * ) Notice: Subject to any disclaimer, the term of this patent is extended or adjusted under 35 U.S.C. 154(b) by 324 days.

(21) Appl. No.: 16/886,707

(22) Filed: May 28, 2020

(65) Prior Publication Data

US 2020/0378422 A1 Dec. 3, 2020

(30) Foreign Application Priority Data

May 31, 2019 (TW) ................................. 108206987

(51) Int. Cl.
*F16B 7/10* (2006.01)

(52) U.S. Cl.
CPC .................................... *F16B 7/105* (2013.01)

(58) Field of Classification Search
CPC .. F16B 7/105; F16B 7/10; F16B 7/042; F16B 35/041; F16B 35/06; Y10T 403/7077; Y10T 403/7079; Y10T 403/32467; Y10T 403/32508; Y10T 403/32475; Y10T 403/32483; Y10T 403/32516; Y10T 403/32524; Y10T 403/32451; F16M 11/26; F16M 11/28; F16M 11/32; A45B 2009/007

USPC ........ 403/109.2, 109.6; 248/407–409, 188.5, 248/354.2, 354.5, 354.6
See application file for complete search history.

(56) References Cited

U.S. PATENT DOCUMENTS 9,192,213 B2 * 11/2015 Lin .......................... A45B 9/04
2003/0156923 A1 * 8/2003 Winkler .................. F16B 7/105
411/552

* cited by examiner

*Primary Examiner* — Ingrid M Weinhold

(57) ABSTRACT

A telescopic tube is disclosed. By pressing and rotating a switching button, an abutting section is aligned to a first hole of an outer tube and then elastically pushed by an elastic member, a pin section of the switching button is released from engagement with a fastening hole of the inner tube, and the position of the inner tube in the outer tube can be adjusted individually. After the inner tube is adjusted completely and the switching button is pressed to rotated again, the pin section is inserted into the fastening hole, the engaging section is engaged in the first hole. When the switching button is pressed, the movement of the inner tube makes the switching button release from the first hole and the third hole, and the inner tube, the control assembly and the inner mounting member are retractable in the through hole of the outer tube.

3 Claims, 20 Drawing Sheets

TELESCOPIC TUBE WITH ADJUSTMENT MEMORY FUNCTION

BACKGROUND OF THE INVENTION

1. Field of the Invention

The present invention relates to a telescopic tube with an adjustment memory function, and more particularly to a telescopic tube can provide a user to set and adjust the telescopic tube to a required length and in next use adjust the telescopic tube to the required length by a one-time operation without setting again in various application fields of telescopic tube, so as to achieve effect of convenience and labor-saving.

2. Description of the Related Art

There are many documents disclosing configuration of the telescopic structure, for example, ROC Patent No. M570040, titled "Multifunctional Crutch", ROC Patent No. M567318, titled "Telescopic Fastening Device", ROC patent No. M561461, titled "Adjustable Office Exercise Chair", ROC Patent No. M486418 "Automatic Telescopic Crutch". These patents disclose the device with retracting function to adjust the length thereof. However, the devices disclosed in these documents have a common disadvantage that after the user adjusts the length of the device, in next use the user must adjust the length again, and the user may not possibly adjust the device to the most suitable position in each adjusting operation, and it consumes time and causes great inconvenience to the user; furthermore, the holes for adjusting the length of the device are generally disposed on the outermost tube, and dust and foreign objects may easily get stuck and accumulated in the hole, and it will affect future adjustments.

SUMMARY OF THE INVENTION

An objective of the present invention is to provide a telescopic tube which can be directly adjusted to an appropriate length by an extending operation in every use without setting again, so as to solve the conventional problem. In order to achieve the objective, the telescopic tube with adjustment memory function of the present invention can be implemented by three embodiments mainly. In the first embodiment, a telescopic tube with an adjustment memory function includes an outer tube having a through hole passing through two opposite ends thereof, and a first hole formed on an end surface thereof and in communication with the through hole, wherein the first hole is elongated; an inner tube inserted into the through hole and having a plurality of fastening holes formed on a side surface thereof, wherein the inner tube is hollow, the plurality of fastening holes are arranged in interval and one of the plurality of fastening holes is configured to correspond in position to the first hole, and the inner tube is retractable and movable relative to the outer tube; an inner mounting member mounted on an outer periphery of the inner tube and movable inside the through hole, wherein the inner mounting member has a second hole disposed correspondingly in position to the first hole, and the second hole is circular; a control assembly mounted between the through hole and an outer wall of the inner tube, and comprising a switching button and an elastic member, wherein the switching button comprises an engaging section, an abutting section and a pin section, the engaging section is connected to a top surface of the abutting section, and the pin section is connected to a bottom surface of the abutting section, and the elastic member is mounted on the pin section, and an end of the elastic member is elastically abutted with the abutting section, a second end of the elastic member is elastically abutted with an outer surface of the inner tube, the abutting section is pivotable inside the second hole; an outer mounting member mounted on an end of the outer tube, wherein the inner tube passes through the outer mounting member, and the outer mounting member has a third hole disposed correspondingly in position to the first hole, the third hole is circular and in communication with the first hole; wherein when the switching button is pressed and rotated to make the abutting section align to the first hole, the abutting section is elastically pushed by the elastic member and the pin section is released from engagement with the fastening hole to form a releasing state, so that a position of the inner tube is adjustable individually; wherein after the inner tube is adjusted completely, the switching button is pressed and rotated to allow the pin section to be inserted into one of the fastening holes and the abutting section to be abutted with the inner wall of the outer tube, and the engaging section is engaged with the first hole to form a restraining status, and when the switching button is directly pressed in the restraining status, telescopic movement of the inner tube makes the switching button release from engagement with the first hole and the third hole, and the inner tube, the control assembly and the inner mounting member become retractable and movable inside the through hole.

In the second embodiment, a telescopic tube with an adjustment memory function includes an outer tube having a through hole passing through two opposite ends thereof, and a first hole formed on an end surface thereof and in communication with the through hole, wherein the first hole is in a round hole; an inner tube inserted into in the through hole, and a plurality of fastening holes formed on a side surface thereof, wherein the inner tube is in a hollow shape, the plurality of fastening holes are arranged in interval and corresponding in position to the first hole, and the inner tube is retractable and movable relative to the outer tube; an inner mounting member mounted on an outer periphery of the inner tube and movable along with the inner tube inside the through hole of the outer tube, wherein the inner mounting member has a second hole formed on a side thereof corresponding in position to the first hole of the outer tube, and the second hole is in a long elliptic hole; a control assembly mounted between the through hole and an outer wall surface of the inner tube, and comprising a switching button and an elastic member, wherein the switching button comprises an engaging section, an abutting section and a pin section, the engaging section is connected to a top surface of the abutting section, and the pin section is connected to a bottom surface of the abutting section, and the elastic member is mounted on the pin section, and an end of the elastic member is elastically abutted with the abutting section, other end of the elastic member is elastically abutted with the outer surface of the inner tube, and a shape of the abutting section is the same as a shape of the second hole; an outer mounting member mounted on an end of the outer tube, wherein the inner tube passes through the outer mounting member, the outer mounting member has a third hole disposed correspondingly in position to and in communication with the first hole, and the third hole is in a round shape; wherein when the switching button is pressed to rotate to make the abutting section align to the through hole, the abutting section is elastically pushed by the elastic member, the pin section is released from engagement with the fastening hole to form a releasing state, so as to adjust a position of the inner tube individually; wherein after the inner tube is adjusted completely and the switching button is pressed to rotated again, the pin section is inserted into the fastening hole and the abutting section is abutted with an inner wall of the outer mounting member to form a restraining status, when the switching button is directly pressed in the restraining status, telescopic movement of the inner tube make the switching button release from engagement with the first hole and the third hole, the inner tube, so that the control assembly and the inner mounting member are movable and retractable in the through hole of the outer tube.

In the third embodiment, a telescopic tube with an adjustment memory function includes an outer tube having a through hole passing through two opposite ends thereof and having a small diameter hole and a large diameter hole formed on an end surface thereof and in communication with the through hole, and a stop member disposed thereon and correspondingly in position to the large diameter hole of the outer tube, wherein the stop member as a limit hole formed correspondingly in position to and in communication with the large diameter hole and the limit hole has a small hole section and a large hole section, the large hole section is stacked on the large diameter hole, and the small hole section is disposed on a surface of the stop member; an inner tube inserted in the through hole and telescopically movable and rotatable relative to the outer tube, wherein the inner tube has a plurality of fastening holes formed on an outer wall surface thereof; an inner mounting member mounted in the through hole and on the outer wall of the inner tube, and having a second hole, wherein a hole diameter of the second hole is larger than that of the small diameter hole and smaller than that of the large diameter hole; a control assembly mounted in the through hole disposed between the outer walls of the outer tube and the inner tube, and comprising a switching button and an elastic member, wherein the switching button comprises an engaging section, an abutting section and a pin section, the engaging section is connected to a top surface of the abutting section, and the pin section is connected to a bottom surface of the abutting section, the elastic member is mounted on the pin section, and an end of the elastic member is elastically abutted with the abutting section, other end of the elastic member is elastically abutted with the outer surface of the inner tube; wherein in a condition that the switching button is pressed and the inner tube is controlled to retract and rotate relative to the outer tube, when the switching button is moved to correspond in position to the small diameter hole, the engaging section is exposed out of the small diameter hole and the abutting section is abutted with the hole wall of the through hole, the pin section is inserted into any one of the plurality of fastening holes of the inner tube to form a restraining status; wherein when the switching button is pressed in the restraining status, the inner mounting member is adjusted and driven to retract and move in the through hole; wherein when the switching button is pressed and the inner tube is rotated at the same time, the switching button is moved to correspond in position to the large diameter hole, the pin section is released from engagement with the fastening hole, and the engaging section is inserted out of the small hole section of the stop member, the abutting section is attached to the stop member and located on the large hole section, so as to individually adjust the retracting position of the outer tube relative to the inner tube.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
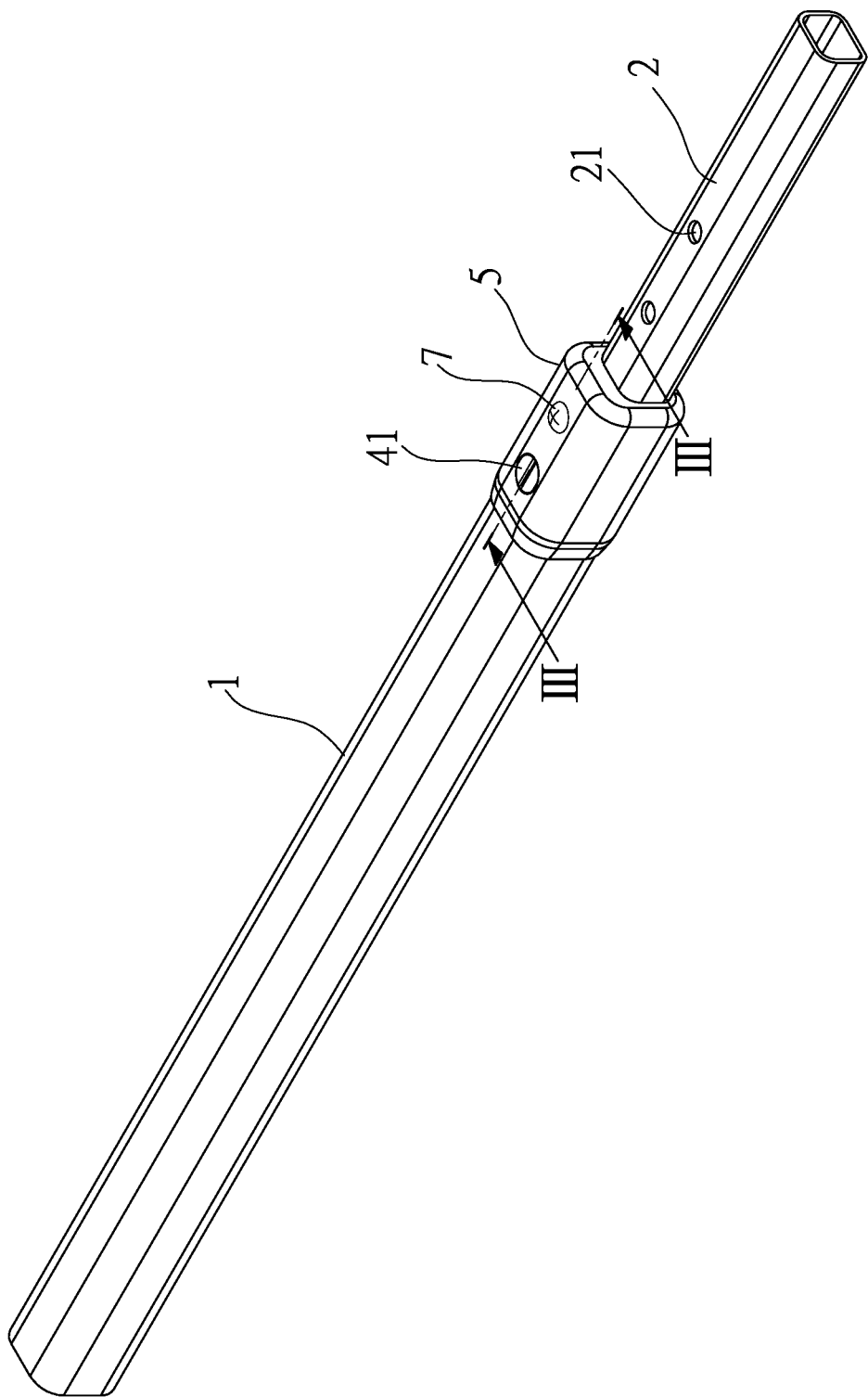
FIG. 1 is a perspective view of a first embodiment of a telescopic tube with an adjustment memory function, according to the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be acknowledged to imply the inclusion of stated elements but not the exclusion of any other elements.

The present invention provides three embodiments. Please refer to FIGS. 1 to 7, which show the first embodiment. As shown in FIGS. 1 to 7, the telescopic tube includes an outer tube 1, an inner tube 2, an inner mounting member 3 and a control assembly 4. The outer tube 1 is hollow, and has a through hole 11 passing through two opposite ends thereof, and a first hole 12 formed on an end surface and in communication with the through hole 11. The first hole 12 is elongated, for example, in the first embodiment of the present invention, an elongated shape is taken as an example of the hole shape of the first hole 12 for illustration; however, the first hole 12 can also be other shape. The inner tube 2 is inserted and assembled in the through hole 11 of the outer tube 1, and the inner tube 2 is in a hollow shape, and has a plurality of fastening holes 21 formed in a side surface thereof. The plurality of fastening holes 21 are arranged in interval and corresponding to a side, in which the first hole 12 is disposed, of the outer tube 1. The inner tube 2 is retractable and movable relative to the outer tube 1. The inner mounting member 3 is in a tubular shape and mounted on an outer periphery of the inner tube 2 and can be moved in the through hole 11 of the outer tube 1 along with the inner tube 2. The inner mounting member 3 has a second hole 31 formed on a side thereof corresponding in position to the first hole 12 of the outer tube 1, and the second hole 31 can be circular, for example, a circular hole is taken as an example for illustration in the first embodiment; however, the second hole 31 can be in other shape. The control assembly 4 is mounted between the through hole 11 of the outer tube 1 and an outer wall surface of the inner tube 2, the control assembly 4 includes a switching button 41 and an elastic member 42, the switching button 41 includes an engaging section 411, an abutting section 412 and a pin section 413, the engaging section 411 is connected to a top surface of the abutting section 412, and the pin section 413 is connected to a bottom surface of the abutting section 412; furthermore, the elastic member 42 is mounted on the pin section 413, and an end of the elastic member 42 is elastically abutted with the abutting section 412, and a second end of the elastic member 42 is elastically abutted with the outer surface of the inner tube 2, the abutting section 412 of the switching button 41 is pivotable in the second hole 31, and a shape of the abutting section 412 corresponds to the shape of the first hole 12 of the outer tube 1, for example, the shape of the abutting section 412 can be a stadium shape or a disco-rectangle shape. The outer mounting member 5 is mounted on an end of the outer tube 1, and the inner tube 2 passes through the outer mounting member 5, and the outer mounting member 5 has a third hole 51 formed correspondingly in position to the first hole 12 of the outer tube 1 and in communication with the first hole 12, and in a round shape, that is, a shape of the third hole 51 matches with that of the engaging section 411 of the switching button 41. By the operation of pressing and rotating the switching button 41, the abutting section 412 can be aligned to the first hole 12 of the outer tube 1 and then elastically pushed by the elastic member 42, so that the pin section 413 of the switching button 41 can be released from insertion engagement with the fastening hole 21 of the inner tube 2 to form a releasing state, and a position of the inner tube 2 in the outer tube 1 can be adjusted individually; at this time, the abutting section 412 of the switching button 41 can be abutted with the inner wall of the outer mounting member 5 to be stopped from being ejected fully. After the inner tube 2 is adjusted completely, the switching button 41 can be pressed to rotated again, the pin section 413 is inserted into one of the fastening holes 21 of the inner tube 2, the abutting section 412 of the switching button 41 is abutted with the inner wall of the outer tube 1, and the engaging section 411 is engaged in the first hole 12, so as to form a restraining status. In the restraining status, the switching button 41 can be directly pressed, telescopic movement of the inner tube 2 can make the switching button 41 release from the engagement with the first hole 12, so that the inner tube 2, the control assembly 4 and the inner mounting member 3 are movable and retractable in the through hole 11 of the outer tube 1.

Figure 2:
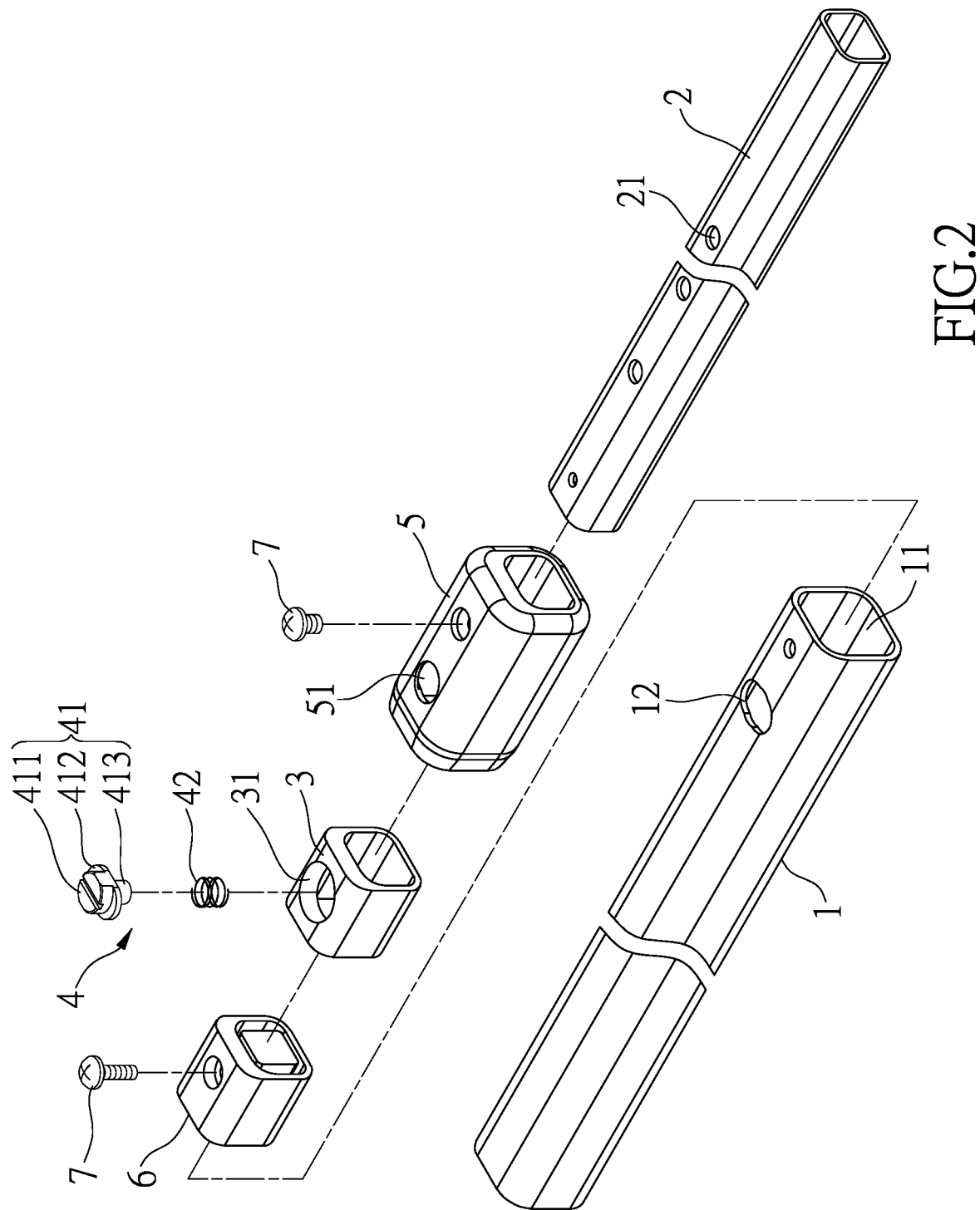
FIG. 2 is a perspective exploded view of the first embodiment of according to the present invention.
Figure 3:
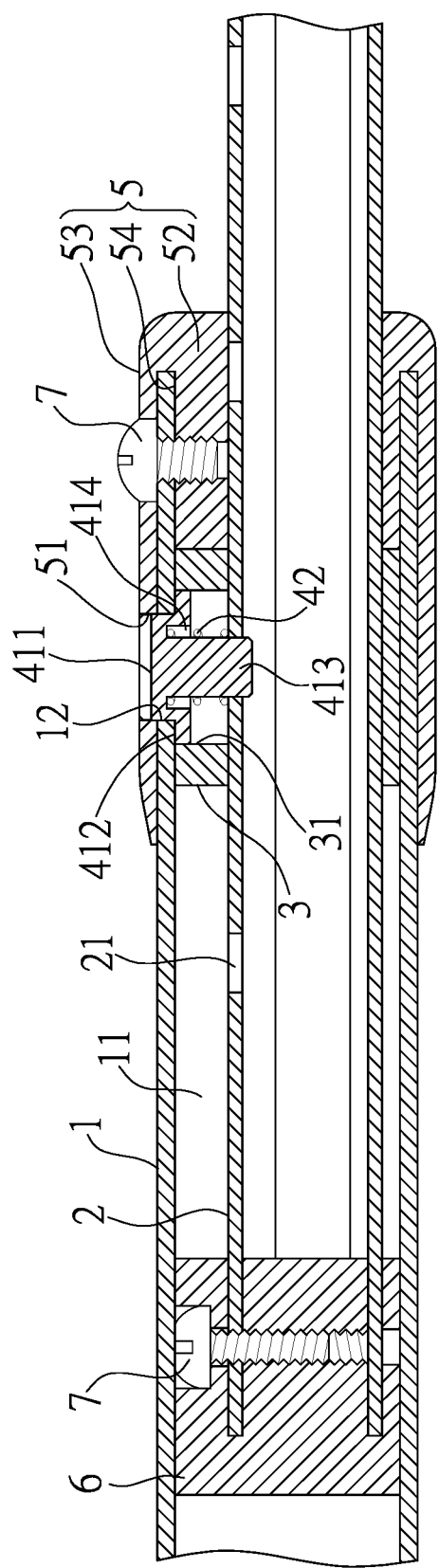
FIG. 3 is a schematic cross-sectional view taken along III-III of FIG. 1.
Figure 4:
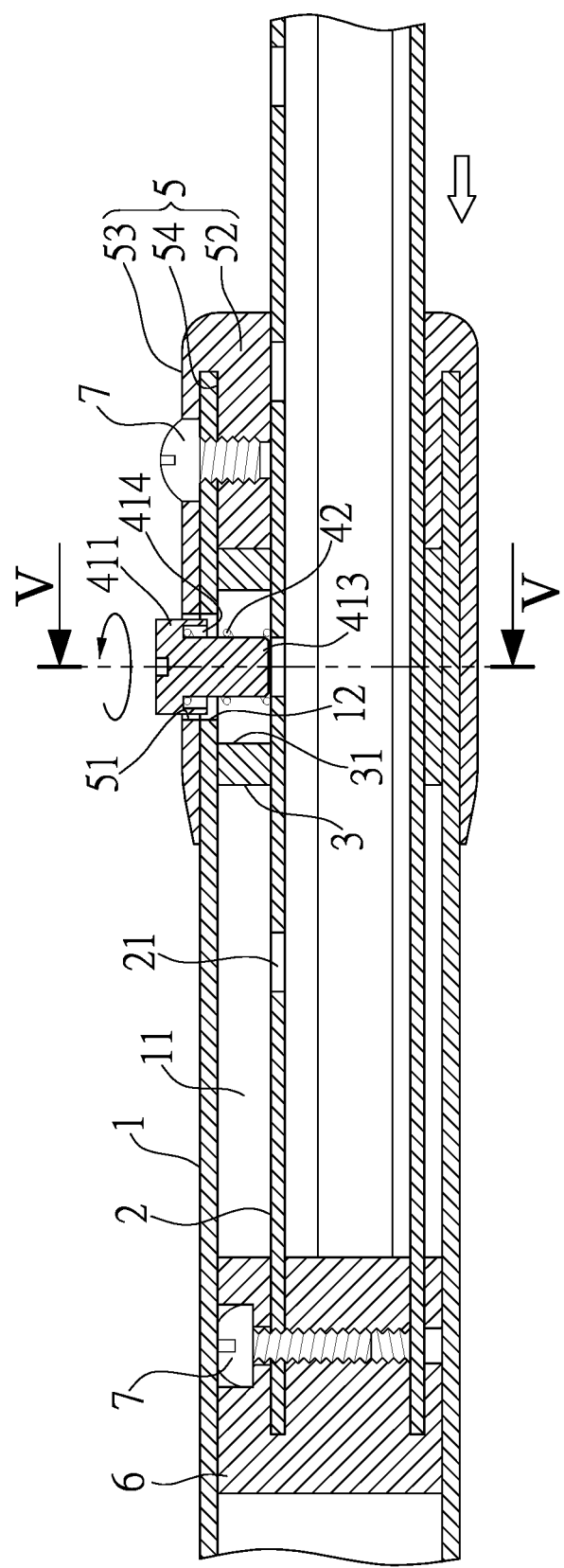
FIG. 4 is a schematic view of operation of adjusting a telescopic tube to set a position of an inner tube, according to the first embodiment of the present invention.
Figure 5:
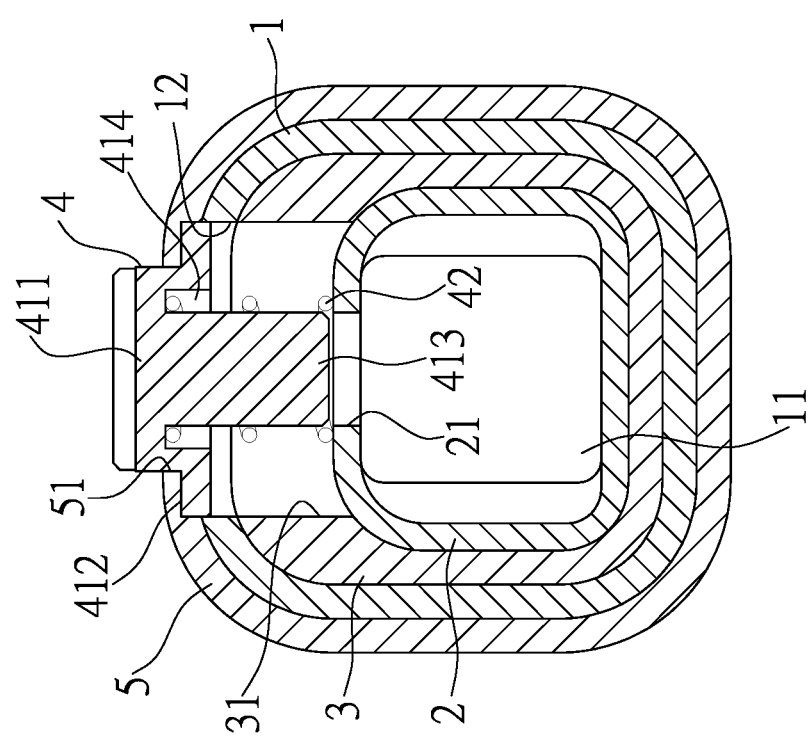
FIG. 5 is a schematic view of operation of adjusting a telescopic tube to set a position of an inner tube according to the first embodiment of the present invention, when viewed from another angle.
Figure 6:
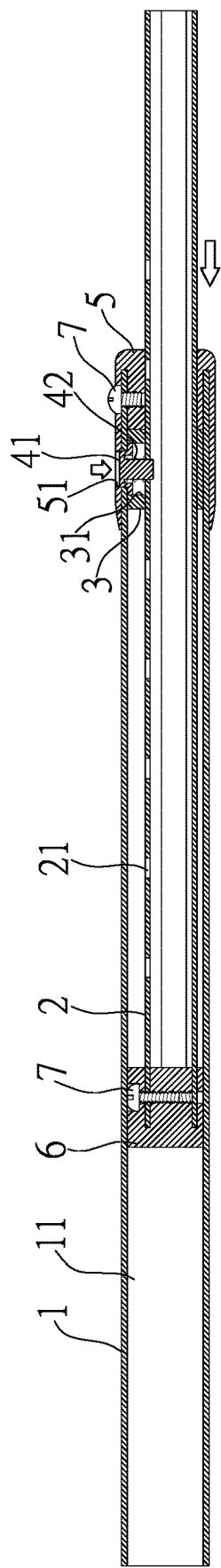
FIG. 6 is a schematic view of a pressing operation in a normal operation mode after the operation of adjusting and setting the position of the inner tube is completed, according to the first embodiment of the present invention.
Figure 7:
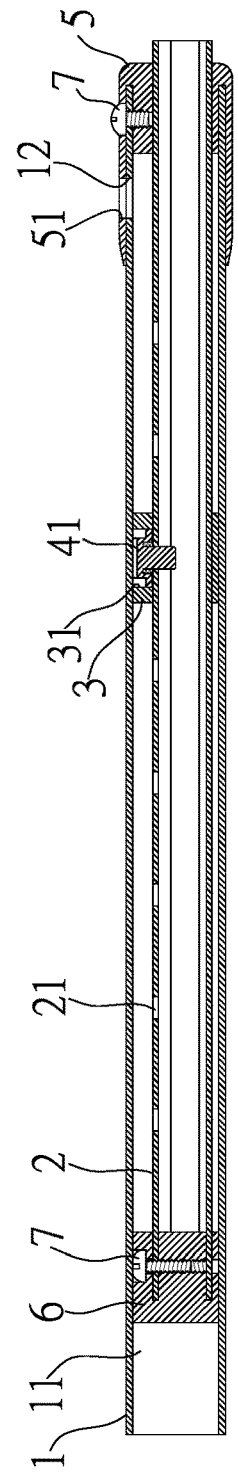
FIG. 7 is a schematic view of an operation of pressing the switching button and pushing the inner tube to retract inwardly, according to the first embodiment of the present invention.
Figure 7A:
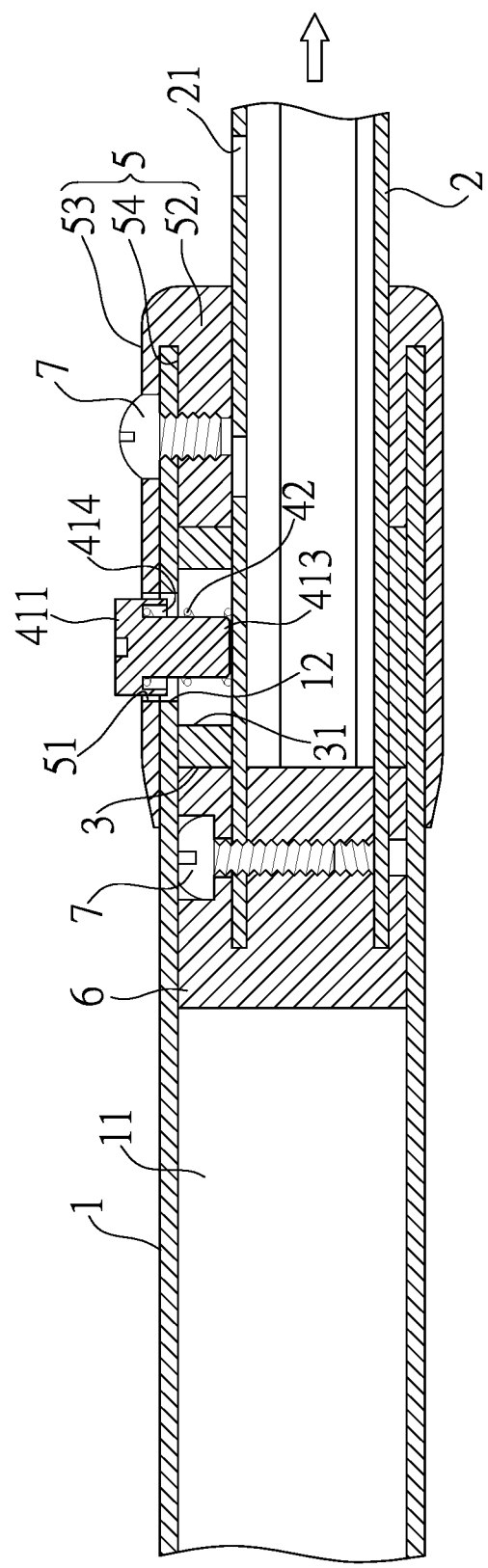
FIG. 7A is a schematic cross-sectional view of an operation of extending the inner tube outwardly to the longest length to make an inner bottom sleeve abut with the inner mounting member in the outer mounting member, according to the first embodiment of the present invention.
Figure 8:
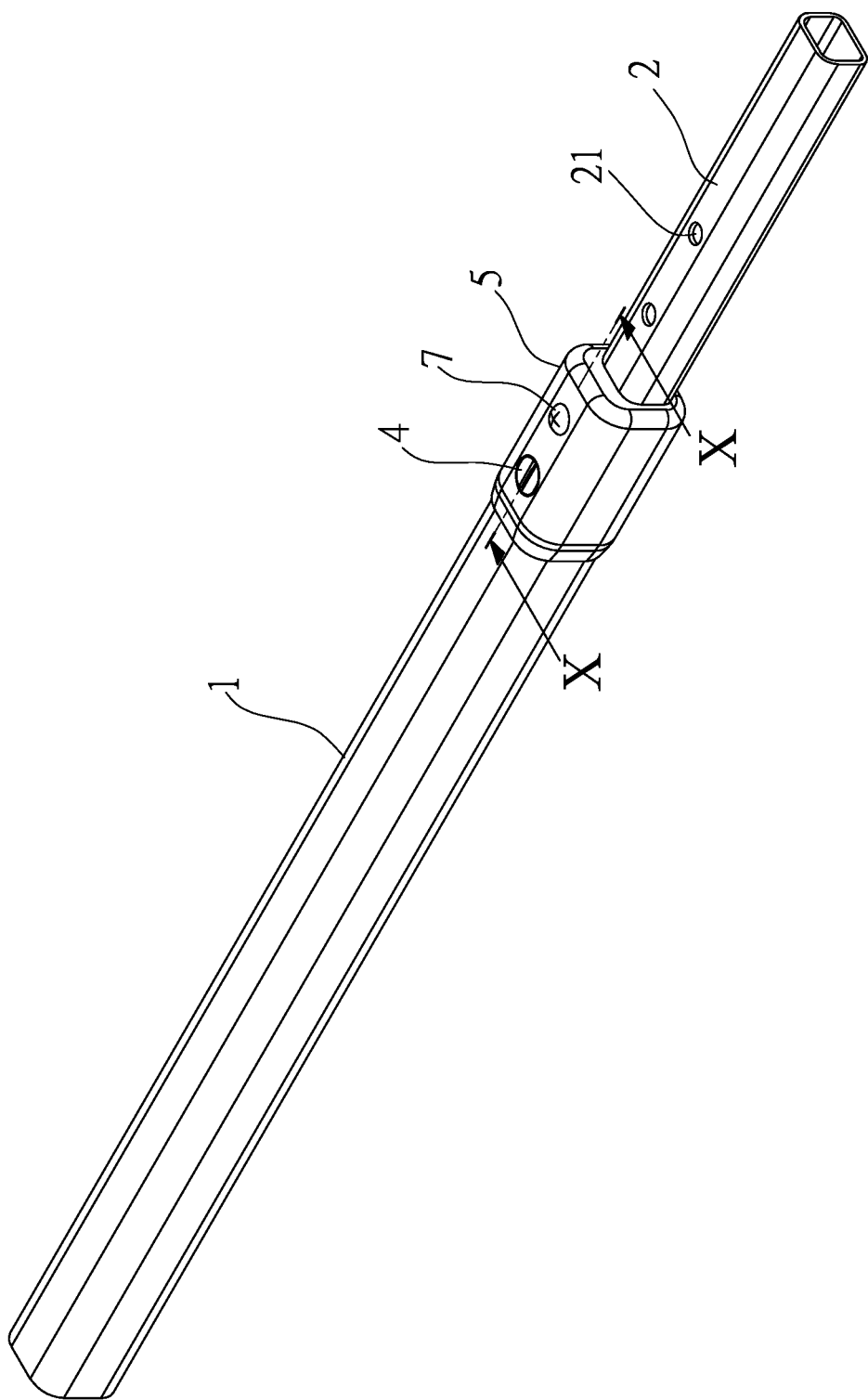
FIG. 8 is a perspective view of a second embodiment of a telescopic tube with adjustment memory function, according to the present invention.
Figure 9:
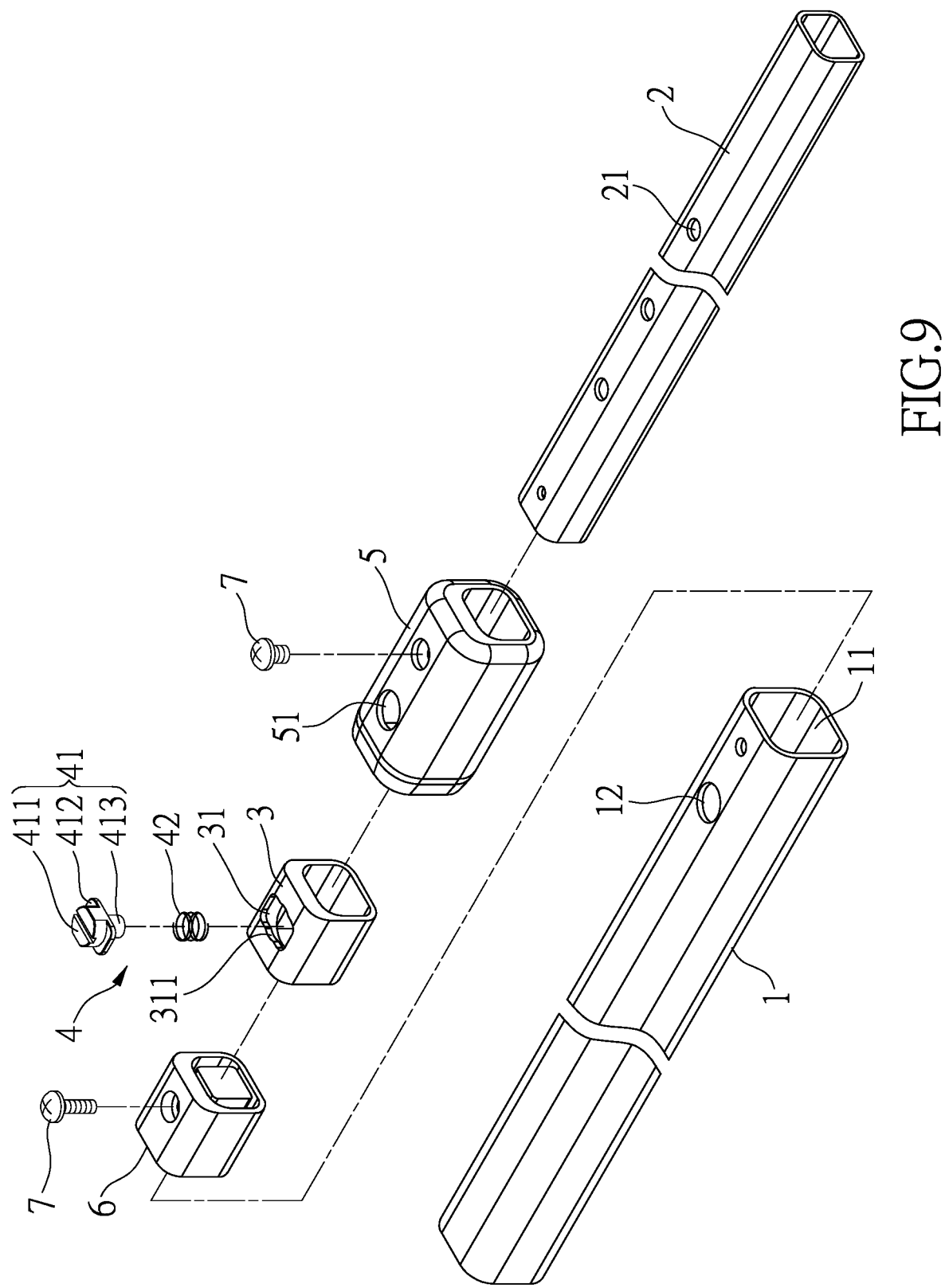
FIG. 9 is a perspective exploded view of the second embodiment of the present invention.
Figure 10:
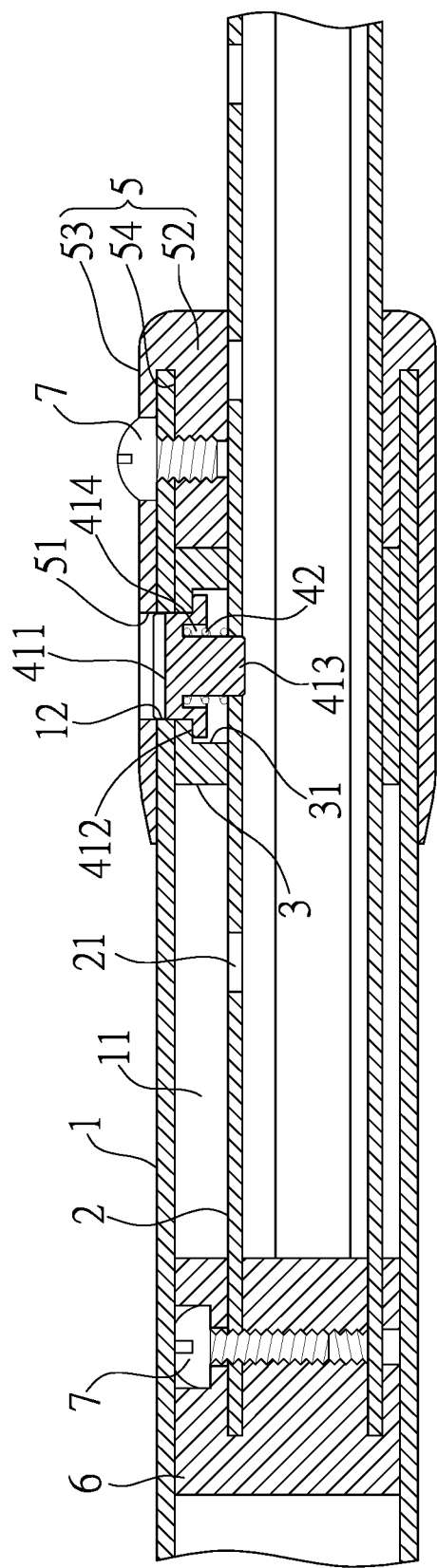
FIG. 10 is a schematic cross-sectional view taken along V-V of FIG. 8.
Figure 11:
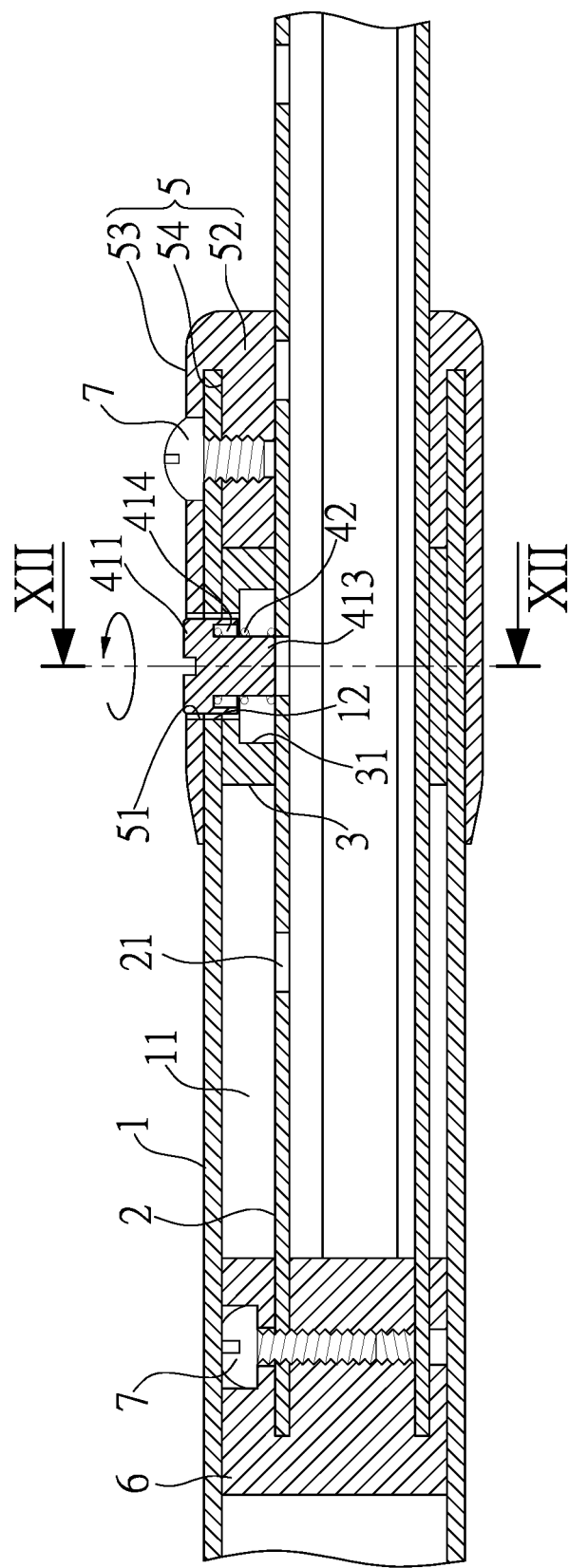
FIG. 11 is a schematic view of an operation of adjusting and setting a position of an inner tube, according to the second embodiment of the present invention.
Figure 12:
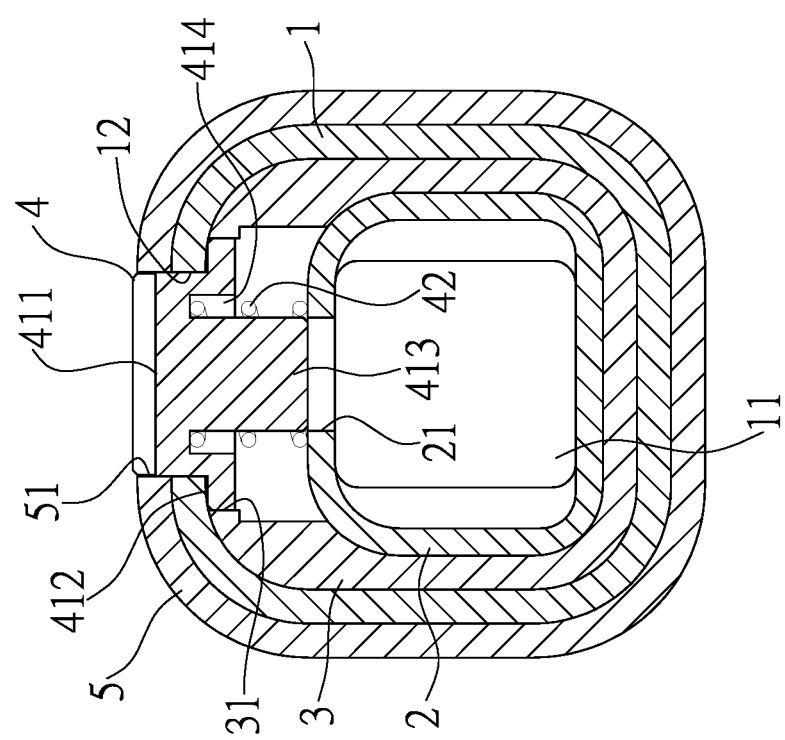
FIG. 12 is a schematic cross-sectional view of an operation of setting a position of an inner tube according to the second embodiment of the present invention, when viewed from another angle.
Figure 13:
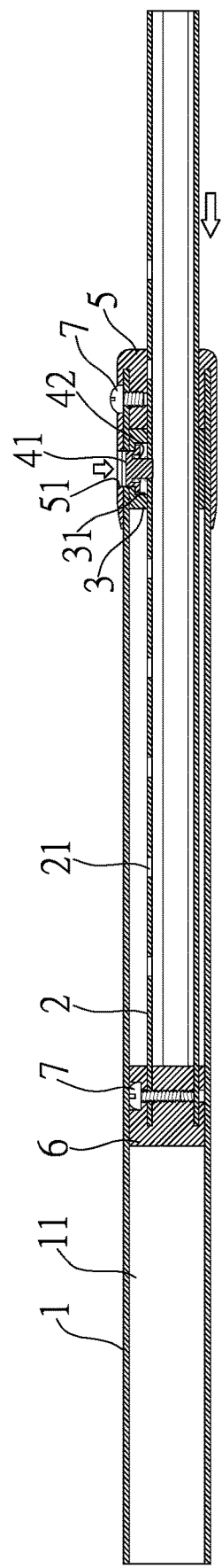
FIG. 13 is a schematic view of an operation of moving a switching button back to operational position after the position of the inner tube is adjusted and set completely, according to the second embodiment of the present invention.
Figure 14:
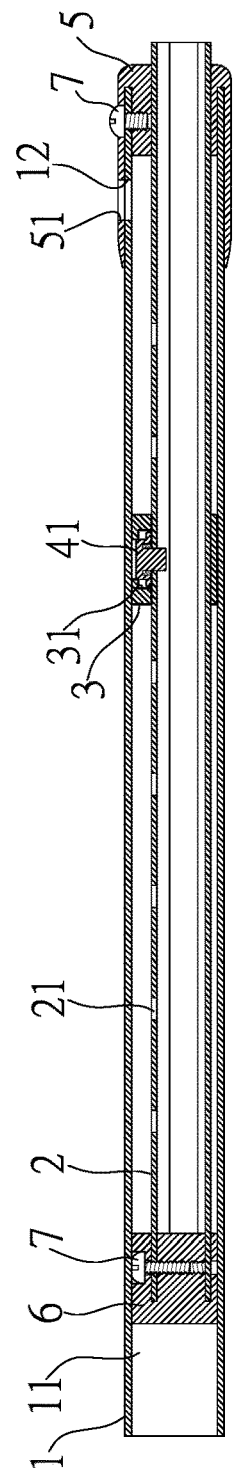
FIG. 14 is a schematic view of an operation of pressing the switching button and pushing the inner tube to retract inwardly, according to the second embodiment of the present invention.
Figure 14A:
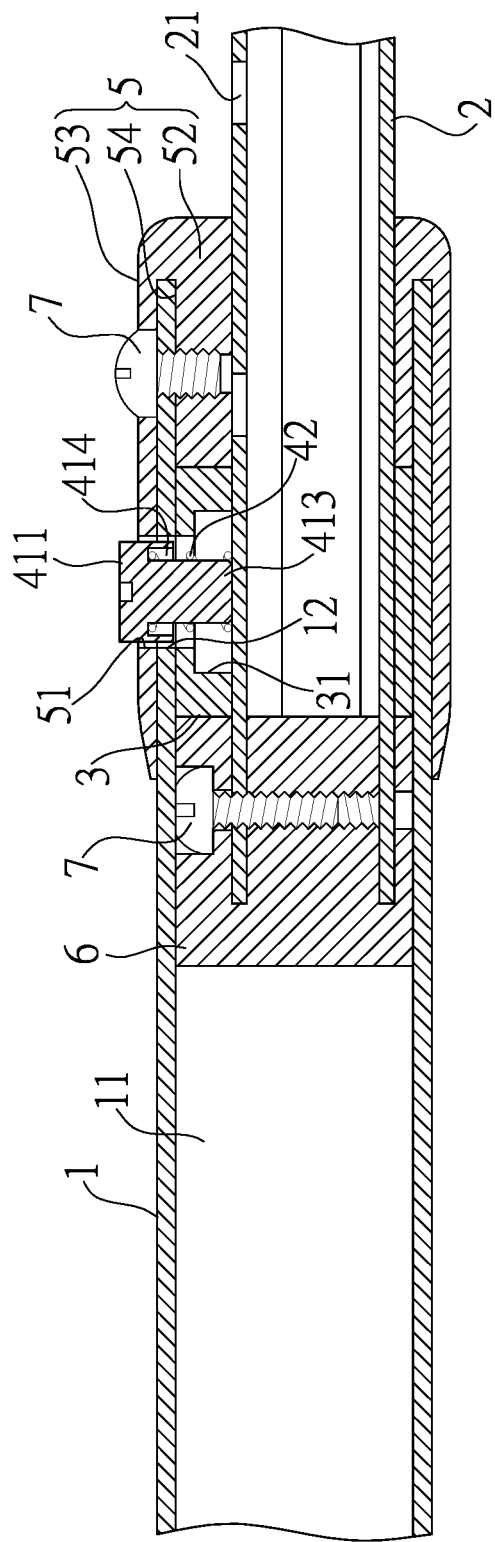
FIG. 14A is a schematic cross-sectional view of an operation of extending the inner tube outwardly to the longest length to make an inner bottom sleeve abut with the inner mounting member in the outer mounting member, according to the second embodiment of the present invention.
Figure 15:
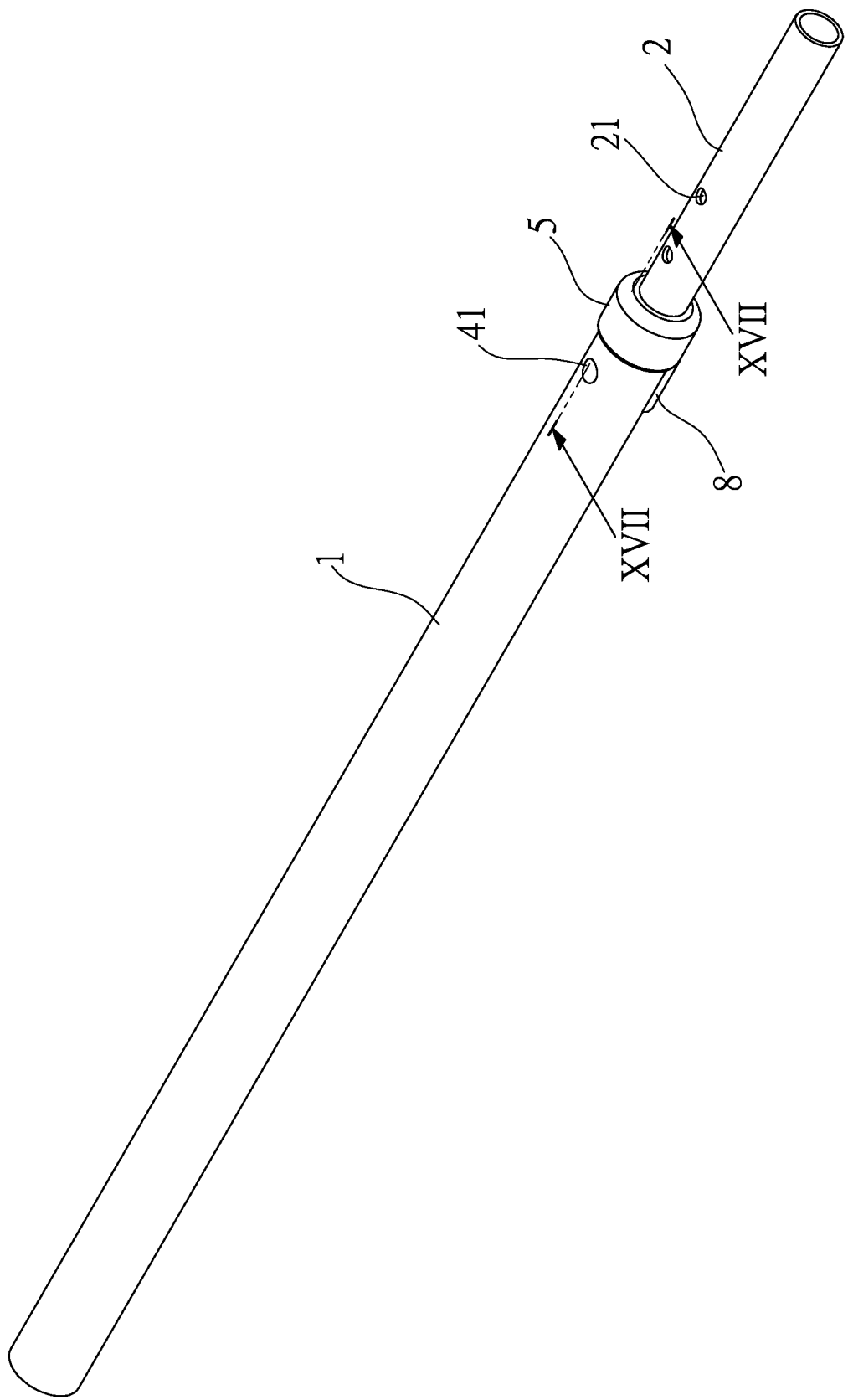
FIG. 15 is a perspective view of a third embodiment of a telescopic tube with adjustment memory function, according to the present invention.
Figure 16:
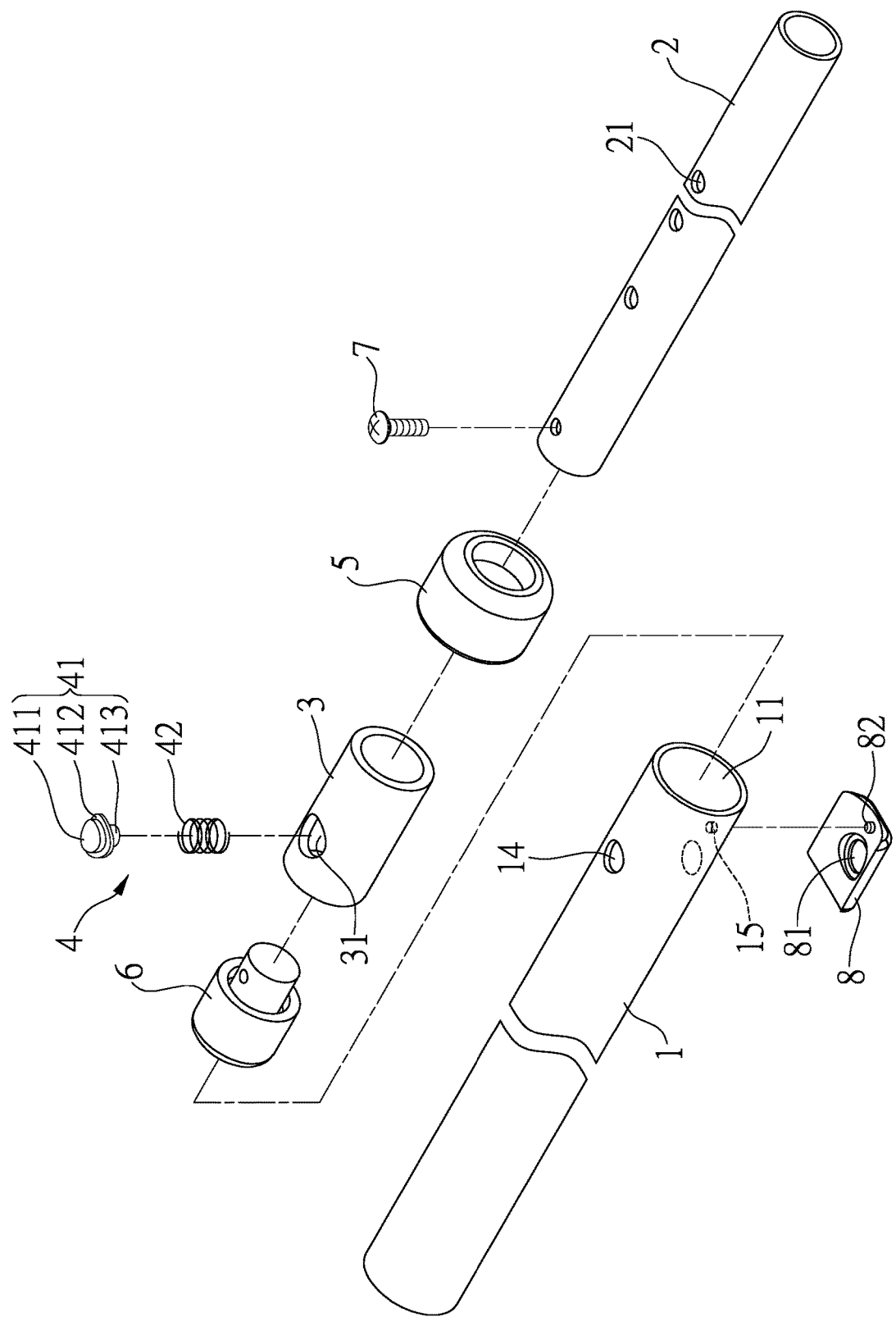
FIG. 16 is a perspective exploded view of the third embodiment of the present invention.
Figure 17:
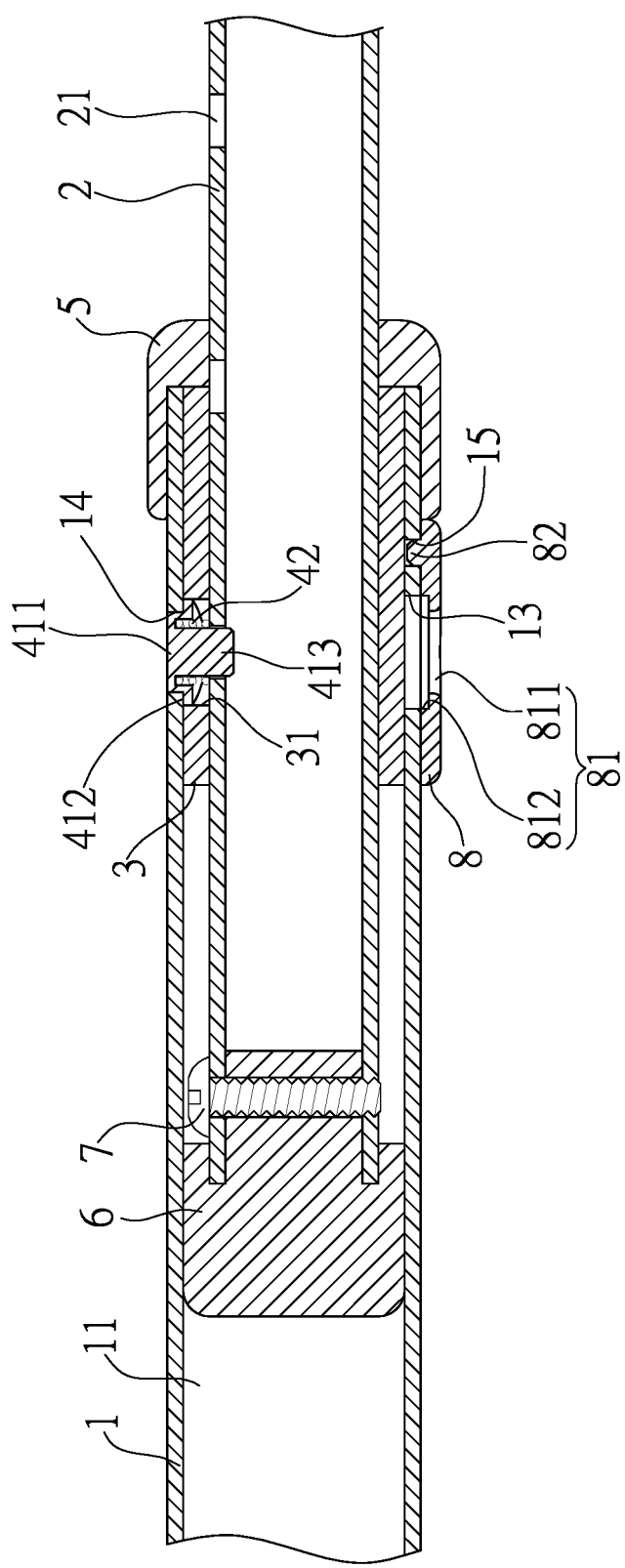
FIG. 17 is a schematic cross-sectional view taken along XVII-XVII of FIG. 15.
Figure 18:
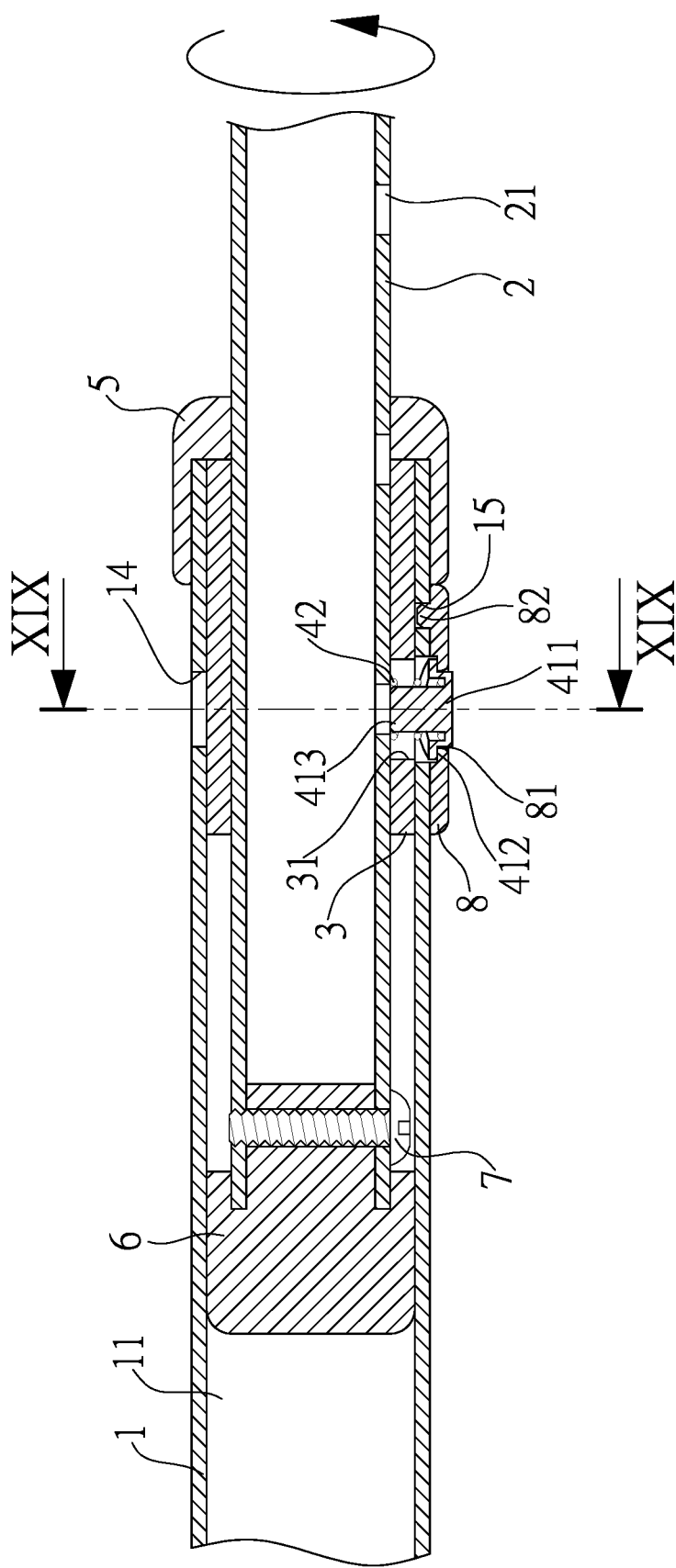
FIG. 18 is a schematic view of operation of adjusting a telescopic tube to set a position of an inner tube, according to the third embodiment of the present invention.
Figure 19:
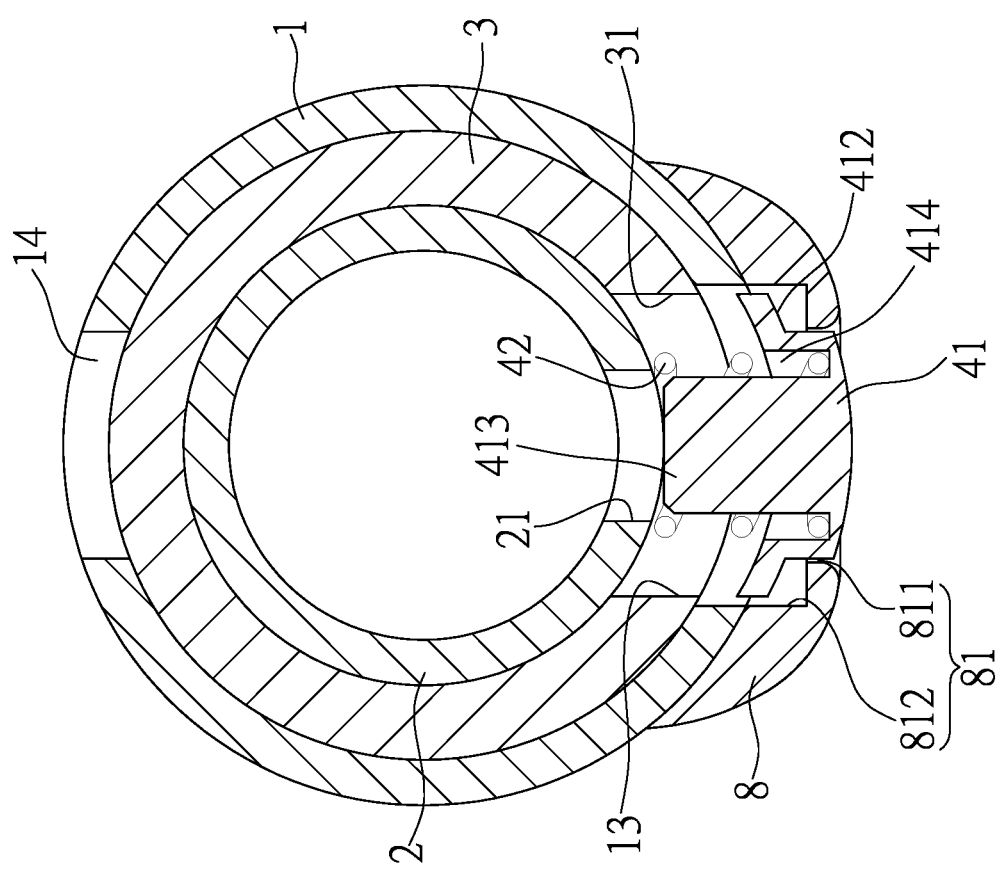
FIG. 19 is a schematic view of operation of adjusting a telescopic tube to set a position of an inner tube according to the third embodiment of the present invention, when viewed from another angle.
Figure 20:
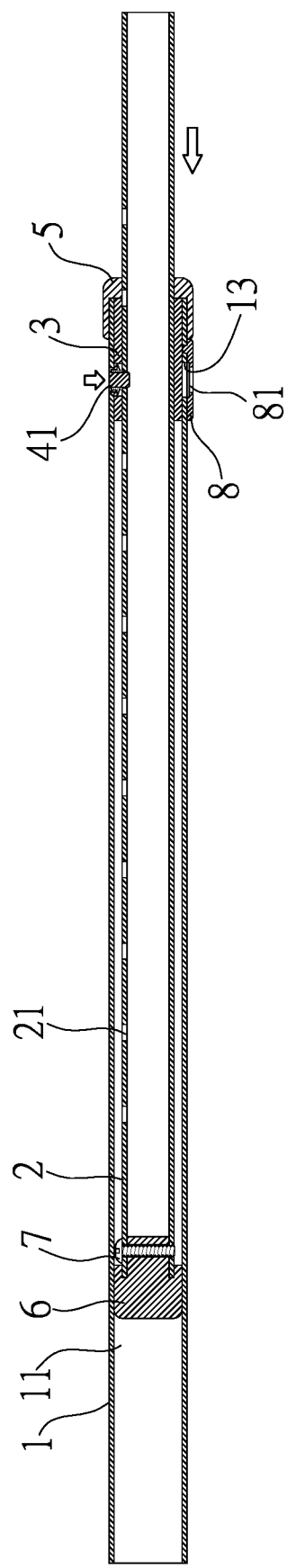
FIG. 20 is a schematic view of moving a switching button back to operational position after the operation of adjusting and setting the position of the inner tube is completed, according to the third embodiment of the present invention.
Figure 21:
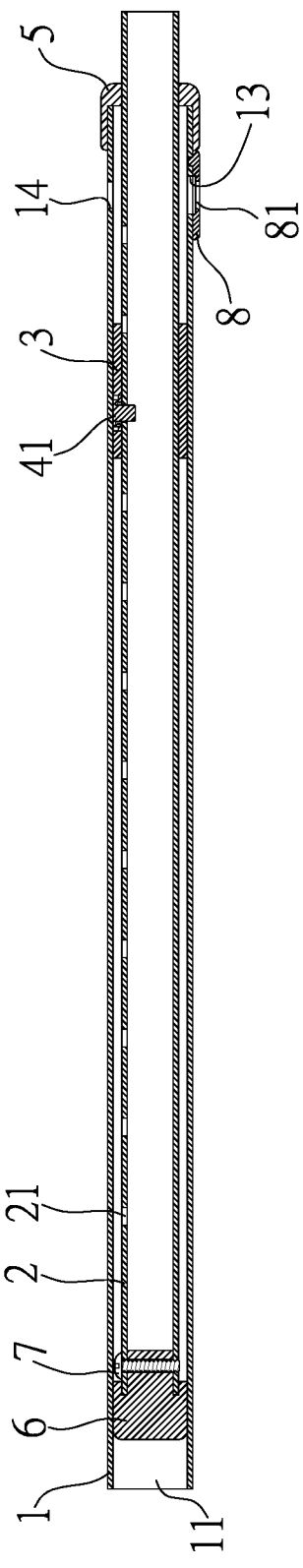
FIG. 21 is a schematic view of an operation of pressing the switching button and pushing the inner tube to retract inwardly, according to the third embodiment of the present invention.

According to aforementioned contents, other technical features and operation thereof are described in following paragraphs. In order to dispose the elastic member 42 stably to prevent from affecting the pressing operation of the switching button 41, the abutting section 412 has an annular fastening groove 414 annularly recessed on an end thereof connected to the pin section 413, the end of the elastic member 42 is engaged in the annular fastening groove 414. With this configuration, the elastic member 42 can be mount stably and prevented from being separated or warped when the switching button 41 is pressed, so that the switching button 41 can be firmly pressed by the user. Please refer to FIGS. 3, 5 to 7. In order to make the inner tube 2 firmly stay in the through hole 11 of the outer tube 1 and prevent the inner tube 2 from being separated from the outer tube during the operation of retracting and adjusting the inner tube 2, the telescopic tube of the present invention can include an inner bottom sleeve 6 and two screws 7, the inner bottom sleeve 6 is mounted on opposite end, which is out of the outer mounting member 5, of the inner tube 2, and the inner bottom sleeve 6 is slidable in the through hole 11 of the outer tube 1. One of the two screws 7 is inserted into the inner bottom sleeve 6 and locked with the inner tube 2, and the other of the two screws 7 is inserted into the outer mounting member 5 and engaged with the outer tube 1. The outer mounting member 5 includes an inner insertion part 52 and an outer cover part 53, a connection groove 54 is annually formed between the inner insertion part 52 and the outer cover part 53, the outer tube 1 is inserted in the connection groove 54, and the inner insertion part 52 is inserted in the through hole 11 of the outer tube 1, the outer cover part 53 is abutted with the outer surface of the outer tube 1, the screw 7 is inserted through the outer cover part 53, the outer tube 1 and the inner insertion part 52, to fasten the outer mounting member 5. With this configuration of the inner bottom sleeve 6 and the outer mounting member 5, during the operation of retracting and adjusting the inner tube 2, the inner bottom sleeve 6 can be used to limit extension of the inner tube 2 when the inner tube is extended to the longest length; in other words, after the inner bottom sleeve 6 is abutted with the inner mounting member 3, the inner bottom sleeve 6 is continuously moved until the inner bottom sleeve 6 is limited by the inner insertion part 52 of the outer mounting member 5, and at this time the inner tube 2 is extended to the longest length, as shown in FIGS. 7A and 2.

According to aforementioned contents, the steps of the operation of adjusting length and memorizing position and using operation of the first embodiment are described in following paragraphs. In order to adjust the length and position of the inner tube 2, a user can press and rotate the switching button 41 to make the abutting section 412 of the switching button 41 align to the first hole 12, so that the switching button 41 is elastically pushed by the elastic member 42 to release the pin section 413 from insertion and engagement with the fastening hole 21, and the abutting section 412 is limited by the third hole 51 to prevent from ejecting out of the third hole 51; at this time, the inner tube 2 can be pulled individually in the through hole 11 of the outer tube 1 to move for position adjustment. After the user determines the length and the position of the inner tube 2, the user can press and rotate the switching button 41 to make the switching button 41 back to the status in which the pin section 413 is inserted into any one of the fastening hole 21, so that the abutting section 412 can be limited in the second hole 31. When user does not need to use the inner tube 2 and desires to shorten the inner tube 2, the user just needs to press the switching button 41 without rotation, the inner tube 2 can be moved after the engaging section 411 is separated from the first hole 12, so that the inner tube 2 can be retracted and moved inwardly toward the through hole 11 of the outer tube; in next use, the user just needs to pull the inner tube 2 until the switching button 41 corresponds in position to the first hole 12 of the outer tube 1 and the third hole 51 of the outer mounting member 5 and is elastically pushed by the elastic member 42 to eject, so that the engaging section 411 can be engaged in the first hole 12 of the outer tube 1 and the third hole 51 of the outer mounting member 5; as a result, the inner tube 2 can reach the memorized location which is set previously, as shown in FIGS. 4 to 7.

According to aforementioned basic structure features, the second embodiment has other structure features different from that of the first embodiment. Please refer to FIGS. 8 to 14. The switching button 41 can be pressed and rotated to make the abutting section 412 align to the second hole 31, and the pin section 413 can be elastically pushed by the elastic member 42 to release from insertion and engagement with any one hole of the inner tube 2, so that the inner tube 2 can reach the retracting adjustment position; at this time, the abutting section 412 can be abutted with the inner wall of the outer tube 1, to prevent from ejecting fully; after the operation of setting the position of the inner tube 2 is completed, the user can press and rotate the switching button 41 again to make the abutting section 412 move back to and be limited by the inner wall of the inner mounting member 3, and the pin section 413 is inserted into any one of the fastening hole 21 naturally. Next, the user can press the switching button 41 again without rotation, and retract the inner tube 2 inwardly into the through hole 11 of the outer tube 1 at the same time, so as to receive the inner tube 2 in the outer tube 1. In next use, the user can directly pull the inner tube 2 to make the engaging section 411 correspond in position to the first hole 12 and the third hole 51 of the outer mounting member 5, to adjust the telescopic tube to the set position by one-time operation; In the second embodiment of the present invention, in order to make the operation of the engaging section 411 of the switching button 41 more smoothly without being affected by the second hole 31 being a long elliptic hole, the second hole 31 of the inner mounting member 3 can have dodge grooves 311 curvedly recessed on both longer sides, respectively, to make the engaging section 411 in a cylinder shape be firmly inserted through the second hole 31 and rotated in the second hole 31.

The difference between the third embodiment and the previous two embodiments is that the inner tubes 2 and the outer tubes 1 of the first and second embodiments are non-round tubes and the setting operations are performed by pressing and rotating the switching buttons 41, but the inner tube 2 and the outer tube 1 of the third embodiment mainly are round tubes, and the setting operation is performed by pressing the switching button 41 first and then rotating the inner tube 2 relative to the outer tube 1. Please refer to FIGS. 15 to 21. The outer tube 1 also has the through hole 11 formed thereon, but the outer tube 1 further has a large diameter hole 13 and a small diameter hole 14 formed on an outer surface of an end thereof and in communication with the through hole 11. A stop member 8 can be assembled with the outer tube 1 and disposed correspondingly in position to the large diameter hole 13. The stop member 8 as a limit hole 81 formed correspondingly in position to and in communication with the large diameter hole 13. The limit hole 81 can be divided into a small hole section 811 and a large hole section 812, the large hole section 812 is stacked on the large diameter hole 13, and the small hole section 811 is disposed on a surface of the stop member 8. A hole diameter of the second hole 31 is larger than that of the small diameter hole 14 of the outer tube 1, and smaller than that of the large diameter hole 13. During the operation of the third embodiment, in order to set the position of the inner tube 2, the user can press the switching button 41 and then rotate the inner tube 2, to drive the switching button 41 to move to the position corresponding to the large diameter hole 13; at this time the elastic member 42 can elastically push the switching button 41 to move toward the limit hole 81, to release the pin section 413 from insertion and engagement with the any one of fastening hole 21, so that the inner tube 2 can be pulled individually to adjust the position thereof. After determining the position of the inner tube 2, the user can press the switching button 41 again to make the pin section 413 insert into the corresponding fastening hole 21, and then rotate the inner tube 2 to drive the switching button 41 to move to the position corresponding to the small diameter hole 14; at this time, the switching button 41 is also elastically pushed by the elastic member 42 to make the engaging section 411 insert into the small diameter hole 14 of the outer tube 1, the abutting section 412 is limited by the small diameter hole 14 to be abutted with the inner wall of the through hole 11, so that the operation of adjusting and setting the position of the inner tube 2 can be completed. Next, in order to receive the inner tube 2, the user just needs to press the switching button 41 and push the inner tube 2 to retract inwardly into the through hole 11, so as to complete the receiving operation. In next use, the user just needs to pull the inner tube 2 to extend outwardly until the switching button 41 reaches the position corresponding to the small diameter hole 14 and is elastically pushed by the elastic member 42 to make the engaging section 411 insert the small diameter hole 14. As a result, the telescopic tube of the present invention can allow the user to extend the inner tube 2 to the desired position quickly without setting the inner tube 2 again.

In order to prevent the inner tube 2 from being excessively pulled to escape from the outer tube 1 during the extending operation, an inner bottom sleeve 6 can be mounted on the opposite end, which may be exposed out of the outer mounting member 5, of the inner tube 2. The inner bottom sleeve 6 is disposed inside the through hole 11 and can be moved along with the telescopic movement of the inner tube 2. In the first and second embodiments, one of the two screws 7 can be inserted into and assembled with the inner bottom sleeve 6 to lock with the inner tube 2, the other of the two screws 7 can be inserted into the outer mounting member 5 to lock with the outer tube 1, so as to block foreign matter from entering the tube. When being pulled by the inner tube 2, the inner bottom sleeve 6 can be abutted with the inner mounting member 3, so as to prevent the inner tube 2 from separating from the outer tube 1, as shown in FIG. 7A; in the third embodiment, only one screw 7 is required, and the screw 7 is inserted into the inner bottom sleeve 6 to lock with the inner tube 2, and the stop member 8 can include a fastening pin 82 disposed thereon and correspondingly in position to the engaging hole 15 of the outer tube 1, the fastening pin 82 is inserted into the engaging hole 15, so as to fasten and assemble the stop member 8 with the outer tube. Therefore, when the inner tube 2 is extended to move to make the screw 7 abut with the inner mounting member 3, the inner tube 2 is extended to the longest length, which is not shown in figures.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A telescopic tube with an adjustment memory function, comprising:
    an outer tube having a through hole passing through two opposite ends thereof, and a first hole formed on an end surface thereof and in communication with the through hole, wherein the first hole is elongated;
    an inner tube inserted into the through hole and having a plurality of fastening holes formed on a side surface thereof, wherein the inner tube is hollow, the plurality of fastening holes are arranged in interval and one of the plurality of fastening holes is configured to correspond in position to the first hole, and the inner tube is retractable and movable relative to the outer tube;
    an inner mounting member mounted on an outer periphery of the inner tube and movable inside the through hole, wherein the inner mounting member has a second hole disposed correspondingly in position to the first hole, and the second hole is circular;
    a control assembly mounted between the through hole and an outer wall of the inner tube, and comprising a switching button and an elastic member, wherein the switching button comprises an engaging section, an abutting section and a pin section, the engaging section is connected to a top surface of the abutting section, and the pin section is connected to a bottom surface of the abutting section, and the elastic member is mounted on the pin section, and an end of the elastic member is elastically abutted with the abutting section, a second end of the elastic member is elastically abutted with an outer surface of the inner tube, the abutting section is pivotable inside the second hole;
    an outer mounting member mounted on an end of the outer tube, wherein the inner tube passes through the outer mounting member, and the outer mounting member has a third hole disposed correspondingly in position to the first hole, the third hole is circular and in communication with the first hole;
    wherein when the switching button is pressed and rotated to make the abutting section align to the first hole, the abutting section is elastically pushed by the elastic member and the pin section is released from engagement with the fastening hole to form a releasing state, so that a position of the inner tube is adjustable individually;
    wherein after the inner tube is adjusted completely, the switching button is pressed and rotated to allow the pin section to be inserted into one of the fastening holes and the abutting section to be abutted with the inner wall of the outer tube, and the engaging section is engaged with the first hole to form a restraining status, and when the switching button is directly pressed in the restraining status, telescopic movement of the inner tube makes the switching button release from engagement with the first hole and the third hole and the inner tube, the control assembly and the inner mounting member become retractable and movable inside the through hole.

2. The telescopic tube with adjustment memory function according to claim 1, wherein the abutting section has an annular fastening groove annularly recessed on an end thereof connected to the pin section, the end of the elastic member is engaged in the annular fastening groove.

3. The telescopic tube with adjustment memory function according to claim 2, further comprising an inner bottom sleeve and two screws, wherein the inner bottom sleeve is mounted on an end of the inner tube that is located within the outer tube, the inner bottom sleeve is slidable in the through hole of the outer tube, one of the two screws is inserted into the inner bottom sleeve and locked with the inner tube, and the other of the two screws is inserted into the outer mounting member and locked with the outer tube.

\* \* \* \* \*